Figures 1, 2, 3:
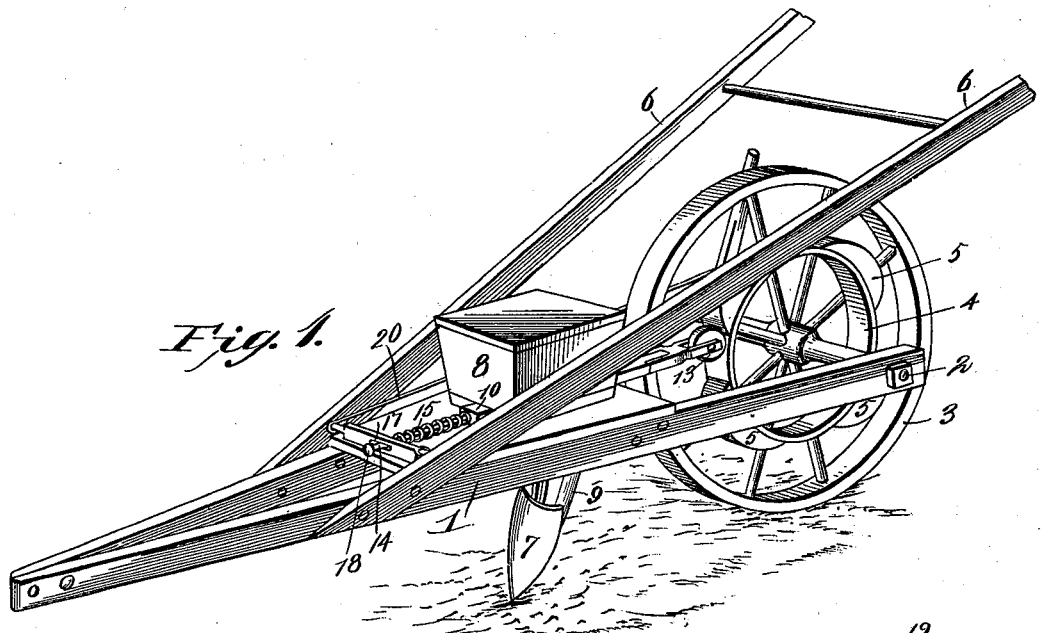

No. 670,616. Patented Mar. 26, 1901.
T. KNAPP.
CORN PLANTER.
(Application filed Oct. 8, 1900.)
(No Model.)

Witnesses
T. Knapp. Inventor.
By C.A. Snow & Co.
Attorneys

UNITED STATES PATENT OFFICE.

THOMAS KNAPP, OF FAYETTE COUNTY, ILLINOIS.

CORN-PLANTER.

SPECIFICATION forming part of Letters Patent No. 670,616, dated March 26, 1901.

Application filed October 8, 1900. Serial No. 32,402. (No model.)

*To all whom it may concern:*

Be it known that I, THOMAS KNAPP, a citizen of the United States, residing in the county of Fayette, in the State of Illinois, have invented a new and useful Corn-Planter, of which the following is a specification.

My invention is an improved planter adapted to plant corn or other seeds either in drills or in hills and at any desired distance apart; and it consists in the peculiar construction and combination of devices hereinafter fully set forth, and pointed out in the claim.

In the accompanying drawings, Figure 1 is a perspective view of a corn-planter constructed in accordance with my invention. Fig. 2 is a top plan view of the same. Fig. 3 is a detail sectional view.

The frame 1 of the planter may be of any suitable construction, and in the same is journaled a shaft 2, which has a covering and traction wheel 3 and a wheel 4, which wheel 4 is provided with a series of cams 5 on its periphery. Any suitable number of the cams 5 may be used, and the same may be secured on the wheel at any desired distance apart, accordingly as it may be desired to plant the seeds closely together or at regular distances apart.

In the form of my invention here shown the frame 1 is provided with handles 6 and with a furrow-opener 7. On the frame is mounted a seed-hopper 8, from the lower side of which leads a seed-spout 9, that discharges in the furrow in rear of the furrow-opener.

The seed-slide 10 operates longitudinally on the bottom of the hopper, extends beyond the front and rear sides thereof, and has the seed cup or opening 11, which coacts with the cut-off 12 to discharge seeds from the hopper through the seed-spout when the seed-slide is reciprocated. At the rear end of the seed-slide is an antifriction-wheel 13, which is adapted to be engaged by the cams 5 of the cam-wheel. The seed-slide is provided at its front end with a forwardly-extending arm 14, on which is a coiled extensile spring 15. A shifting lever 16 is pivoted at one end on the frame 1, the said shifting lever being transversely disposed thereon. Said shifting lever has a longitudinal slot 17, in which the arm 14 operates, and the latter is provided at its front end with a stop, head, or button 18, engaged by said shifting lever when the latter is moved forward, so as to cause the seed-slide to be moved forward with said shifting-lever. A hand-lever 19 is suitably mounted and disposed near and under one of the handles 6 and is connected to the shifting lever by a rod 20.

The spring 15 bears rearwardly against the front end of the seed-slide 10 and imparts retrograde motion to the seed-slide, the latter being moved forward by each of the cams 5 in succession when the machine is in operation, as the said cams engage the wheel 13 at the rear end of the seed-slide. It will be understood that the said cam-wheel and the said spring coact to impart reciprocating motion to the seed-slide. The latter is in gear with the cam-wheel when the shifting lever 16 is moved rearward by the hand-lever 19 to the position indicated in Figs. 1 and 2 of the drawings. When it is desired to throw the seeding mechanism out of gear to discontinue the operation of the planter at any time, as when turning at the end of a row, this may be accomplished by moving the shifting lever 16 forward by means of the hand-lever 19, said shifting lever engaging the head, stop, or button 18 on the arm 14 of the seed-slide and moving the latter forward, so that its wheel or roller 13 is moved out of the path of the cams 5.

Inasmuch as the shifting lever 16 bears on the outer end of the spring 15 the tension of the latter may be varied, when the slide is in operative engagement with the cam-wheel, by moving said shifting lever, as will be understood, to increase or decrease the pressure of the spring on the slide as may be requisite to secure the efficient operation of the latter under all conditions with the least possible expenditure of power.

A planter thus constructed is exceedingly light, cheap, and simple, is thoroughly efficient, and is not likely to get out of order.

Having thus described my invention, I claim—

In a planter, the combination of a frame, a hopper thereon, a cam-wheel carried by said frame and in rear of said hopper, a longitudinally-movable seed-slide in said hopper, having a roller at its rear end to engage said cam-wheel, said seed-slide being further provided with a forwardly-extending arm projecting beyond the front side of the hopper and having a stop, a spring on said forwardly-projecting arm, a shifting lever fulcrumed on said frame and having an opening through which said arm extends, said shifting lever engaging said spring and said stop on said arm, and thereby adapted to throw said roller in or out of engagement with said cam-wheel and to vary the pressure of the spring on the slide while the latter is in operative engagement with the cam-wheel, substantially as described.

In testimony that I claim the foregoing as my own I have hereto affixed my signature in the presence of two witnesses.

THOMAS  his X mark  KNAPP.

Witnesses:
WILLIAM T. SELLERS,
HENRY A. MINOR.